United States Patent [19]

Kilström

[11] Patent Number: 5,775,922
[45] Date of Patent: Jul. 7, 1998

[54] SLIP RING DEVICE FOR A CABLE REEL

[75] Inventor: Lars Kilström, Täby, Sweden

[73] Assignee: Aktiebolaget Electrolux, Stockholm, Sweden

[21] Appl. No.: 729,346

[22] Filed: Oct. 16, 1996

[30] Foreign Application Priority Data

Nov. 9, 1995 [SE] Sweden ............... 9503968

[51] Int. Cl.$^6$ ............................................. H01R 39/08
[52] U.S. Cl. .................................... 439/23; 439/26
[58] Field of Search ..................... 439/23–26, 28, 439/20, 21

[56] References Cited

U.S. PATENT DOCUMENTS 3,297,973  1/1967  Wendell ........................ 439/26
3,321,728  5/1967  Cocco et al. .................. 439/26
4,701,974  10/1987  König et al. ................... 15/323

*Primary Examiner*—Gary F. Paumen
*Attorney, Agent, or Firm*—Pearne, Gordon, McCoy and Granger

[57] ABSTRACT

A slip ring device for a cable reel (10) or the like having a cable drum (11) rotating on a stationary shaft (14). The drum is provided with at least one contact (22) to which a cable (12) of the cable reel (10) is connected. The slip ring (31, 32) arranged on the shaft (14) and against which the contact rests includes a thread or strip-shaped element (28, 29) of electrically conductive material which is wound about the shaft.

17 Claims, 1 Drawing Sheet

SLIP RING DEVICE FOR A CABLE REEL

BACKGROUND OF THE INVENTION

1. Field of the Invention

The present invention relates to a slip ring device for a cable reel having a cable drum or the like rotating on a stationary shaft, the drum being provided with at least one contact to which the cable of the reel is connected.

2. Description of the Related Art

Cable reels of the type mentioned above are previously known and are used, for instance, on vacuum cleaners (See Swedish Patent No. SE 386,063). The reel is arranged inside the shell of the vacuum cleaner and comprises a drum on which the cable is normally stored. Rotation of the drum to wind the cable about the drum is achieved by means of a spring which is tensioned when the cable is pulled out. When an arresting mechanism is released, the spring force is used to rotate the drum and wind the cable about the drum.

In order to transfer electrical energy in the previously known arrangements from the cable, which is connected to a wall socket, to the vacuum cleaner motor and other electric equipment in the vacuum cleaner, the cable drum is provided with contacts to which the wires of the cable are connected. These contacts rest on electric conductors in the form of slip rings having different diameters arranged on a side wall of the cable reel, wherein the side wall is secured to the vacuum cleaner.

A disadvantage with this arrangement is that it comprises a large amount of separate parts in the form of electric conductors, contact pins, slip rings and contacts which complicates mounting or assembly, and requires a comparatively large material consumption, making the arrangement comparatively expensive. The position of the slip rings also means that the friction moment, which results from abutment of the contacts with the slip rings, is rather large. It is also usually difficult to repair damage to the cable which typically appears at the connection point of the cable reel since the cable reel has to be removed from the vacuum cleaner to make the repair area accessible.

SUMMARY OF THE INVENTION

It is an object of the present invention to remove at least some of the aforementioned disadvantages, and to achieve a material saving, simple and, hence, inexpensive slip ring arrangement, to create the smallest possible friction resistance during winding and unwinding, and to make it possible to remove the cable from the drum without removing the cable reel from the vacuum cleaner.

In accordance with the present invention, a cable reel has a cable drum rotatably mounted upon a stationary shaft, and the drum includes a contact to which a cable of the cable reel is connected. A slip ring device is arranged on the shaft and in engagement with the contact. The slip ring includes an element of electrically conductive material which is wound about the shaft in a plurality of turns.

In further accordance with the present invention, the shaft has a peripheral groove and a channel extending from one end of the shaft into the groove. The element has one portion which is wound about the shaft and received within the groove and another portion which extends through the channel.

In further accordance with the present invention, the member is releasably secured to a track in the cable drum, and the element is thread or strip-shaped.

BRIEF DESCRIPTION OF THE DRAWINGS

An embodiment of the invention will now be described with reference to the accompanying drawings, wherein.

DETAILED DESCRIPTION OF THE PREFERRED EMBODIMENT

Figure 1:
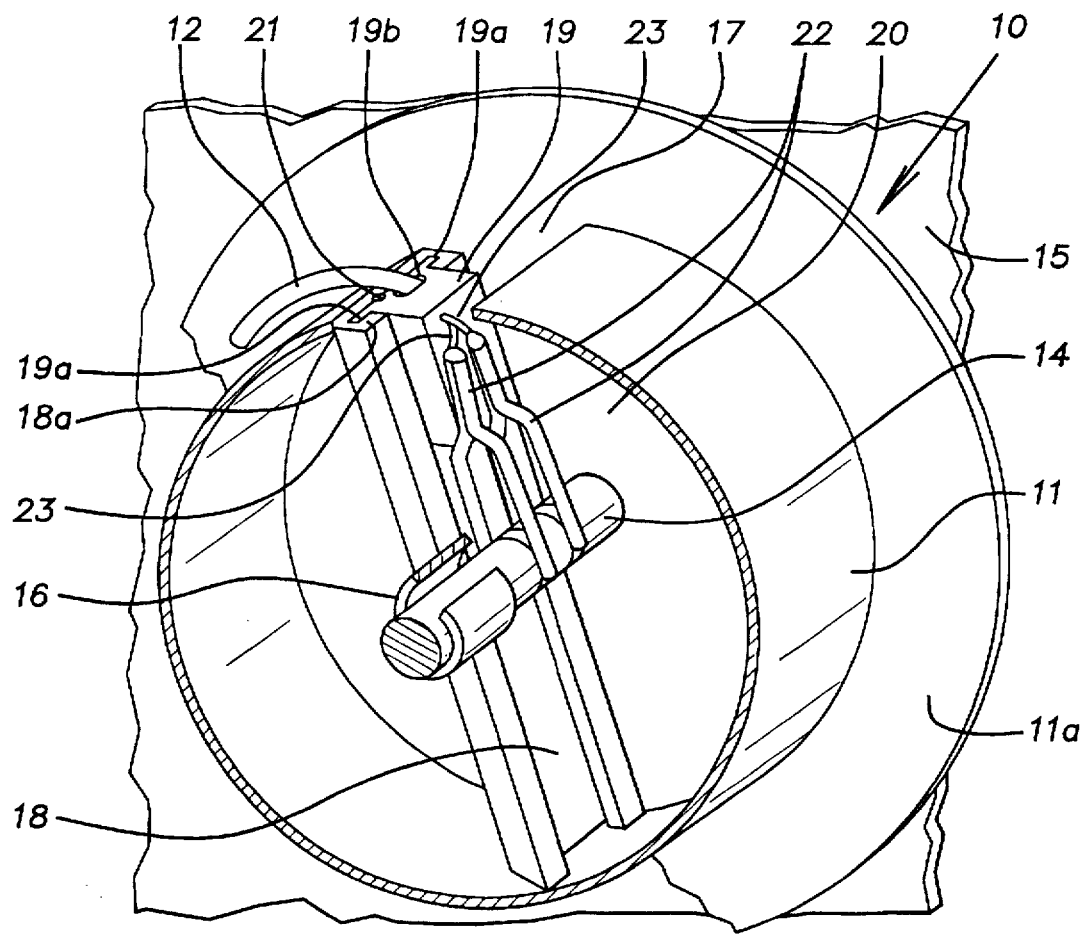
FIG. 1 is a partly broken perspective view of a device according to the invention.
Figure 2:
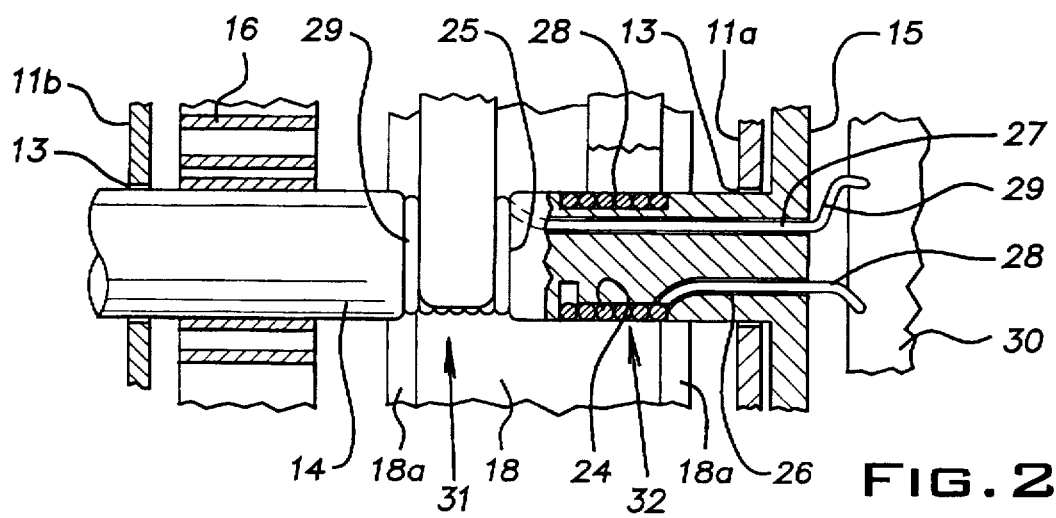
FIG. 2 is a partly broken vertical projection of the slip ring arrangement shown at the center of FIG. 1.

As appears from FIGS. 1 and 2, the cable reel 10 comprises a drum 11 on which a cable 12 can be wound. The cable drum has side walls 11a and 11b which keep the cable 12 on the drum 11. The side walls each have a central circular opening 13 through which a stationary shaft 14 extends. The shaft 14 is a part of, or is connected to, a wall part 15 of the cable reel 10, the wall part 15 being fixed to the vacuum cleaner. The cable reel 10, in the usual way, also comprises a spring 16, which acts between the cable drum 11 and the stationary shaft 14, the spring 16 being tensioned when the cable 12 is pulled out from the vacuum cleaner. In order to lock the cable 12 in its extended position, there is also a conventional arresting mechanism (not shown).

The drum 11 has an opening 17, and from this opening, a bar 18 extends mainly radially inwards towards the opposite wall part of the drum 11. The bar 18 supports a sliding element 19 which, from the outside of the drum, can be inserted into a space 20 which is formed in the central part of the drum 11 and, by means of a screw 21 or the like, can be fixed to the bar 18. The bar 18 has hook-shaped edge parts 18a cooperating with extending edge parts 19a on the sliding element 19 to form a dovetail-type connection to keep the sliding element secured to the bar 18 during assembly.

The sliding element 19 supports two resilient contacts 22 arranged in a side-by-side relationship and directed radially inwards. The contacts 22 are yoke-shaped and have legs with outer ends which are inclined outward so that they will engage the shaft 14 at opposite sides thereof when the sliding element 19 is inserted into the space 20. The sliding element 19 also has an opening 19b through which two wires or conduits 23 of the cable 12 can be connected to the contacts 22 by means of soldering, screws or by other suitable means of mechanical attachment.

The shaft 14 has two peripheral grooves 24, 25, each of which, via a channel or passageway 26, 27, is connected to one end of the shaft. Threads 28, 29 of electrically conductive material are helically wound in more than one turn about the shaft 14 in the grooves 24, 25, respectively. The end of each thread 28, 29 is secured in the respective groove 24, 25. Although described herein as threads, the term "threads" is meant to describe any thin, elongated, flexible electrically conductive material, such as small diameter wires or flat strip-shaped elements. The threads 28, 29 extend through the mainly axial channels 26, 27 in the shaft 14 to the outside of the end of the shaft where they are connected to the electric circuit 30 of the vacuum cleaner. Thus, the threads 28, 29 wound in the grooves 24, 25 form slip rings 31, 32, respectively, which are engaged by the contacts 22.

The device operates in the following way. When the cable reel 10 is mounted, the shaft 14 is inserted through the openings 13 of the side walls 11a, 11b of the drum 11 whereby the cable drum 11 is supported for rotation on the shaft 14. Then the sliding element 19, with associated contacts 22 and the cable 12, is placed on the bar 18 and is moved radially inwards towards the center of the drum 11 and toward the shaft 14. The diverging ends of the contacts 22 abut the slip rings 31, 32 on the shaft. When the sliding element 19 is pushed further toward the shaft, the diverging ends of the contacts 22 move outward and are resiliently pressed against the threads 28, 29 regardless of the position the cable drum takes during rotation. In order to prevent the sliding element 19 from separating from the cable drum, the sliding element 19 is secured to the bar 18 by means of the screw 21. Current which enters via the cable 12 will thus be transmitted to the threads 28, 29 via the contacts 22 and from there to the electric circuit 30 of the vacuum cleaner.

For purposes of repair, the cable 12 and sliding element 19 can be removed from the drum 11, without removing the drum 11 or reel 10 from the host machine simply by removing the screw 21 from the sliding element 19 and pulling the sliding element away from the bar 18.

It should be observed that, also, if this invention primarily is applicable on cable reels of different types, for instance for household apparatus such as vacuum cleaners and food preparing machines, it is of course also possible to use the principal of the invention for other technical areas where slip ring arrangements are used to transmit electric energy between two or more parts which are rotating with respect to each other. Therefore, the present invention is not limited to the specific embodiment described in detail herein, but rather will encompass and include all device within the scope of the claims appended hereto.

What is claimed is:

1. A slip ring device for a cable reel (10), said cable reel having a cable drum (11) rotatably mounted on a stationary shaft (14), said drum including at least one contact (22) to which a cable (12) of the cable reel (10) is connected, wherein a slip ring (31, 32) is arranged on the shaft (14) and in engagement with said contact, said slip ring comprising an element (28, 29) of electrically conductive material which is wound about the shaft in a plurality of turns.

2. A slip ring device according to claim 1, wherein the shaft (14) has at least one peripheral groove (24, 25) which receives said slip ring.

3. A slip ring device according to claim 1, wherein one portion of the element (28, 29) is wound around said shaft and another portion of said element extends through a channel (26, 27) in the shaft to connection points outside the cable reel.

4. A slip ring device according to claim 3, wherein the channel (26, 27) is generally parallel to an axis of the shaft.

5. A slip ring device according to claim 1, wherein the shaft (14) has at least two slip rings (31, 32) which are spaced from one another along the shaft.

6. A slip ring device according to claim 1, wherein the contact (22) and an end of the cable are fixed to a member (19) which is removably fastened to the cable drum.

7. A slip ring device according to claim 6, wherein said member (19) is movable on a track (18) in the cable drum.

8. A slip ring device according to claim 1, wherein the contact (22) is yoke-shaped, one leg of the contact abutting one side of the slip ring (30, 31) and the other leg abutting a diametrically opposite side of the slip ring.

9. A slip ring device according to claim 1, wherein said element is thread-shaped.

10. A slip ring device according to claim 1, wherein said element is strip-shaped.

11. A slip ring device for a cable reel (10), said cable reel comprising a cable (12), cable drum (11), and a stationary shaft (14), said cable being wrapped around said drum, said drum being rotatably mounted over said shaft and including a pair of contacts to which said cable is electrically connected, said slip ring device comprising a pair of slip rings (31, 32) arranged on said shaft, each of said slip rings being in engagement with one of said pair of contacts, wherein each of said slip rings (31, 32) comprises an element (28, 29) of electrically conductive material which is wound about the shaft in a plurality of turns.

12. A slip ring device according to claim 11, wherein said shaft has a pair of peripheral grooves formed therein, each of said grooves receiving one of said slip rings.

13. A slip ring device according to claim 11, wherein a first portion of said element is received within a groove in said shaft and a second portion of said element extends through a channel in said shaft.

14. A slip ring device according to claim 11, wherein the contacts and an end of the cable are fixed to a member (19) which is removably secured to the cable drum.

15. A slip ring device according to claim 14, wherein the member is movable on a track (18) in the cable drum.

16. A slip ring device according to claim 11, wherein the element is thread-shaped.

17. A slip ring device according to claim 11, wherein the element is strip-shaped.

* * * * *